Patented Oct. 7, 1941

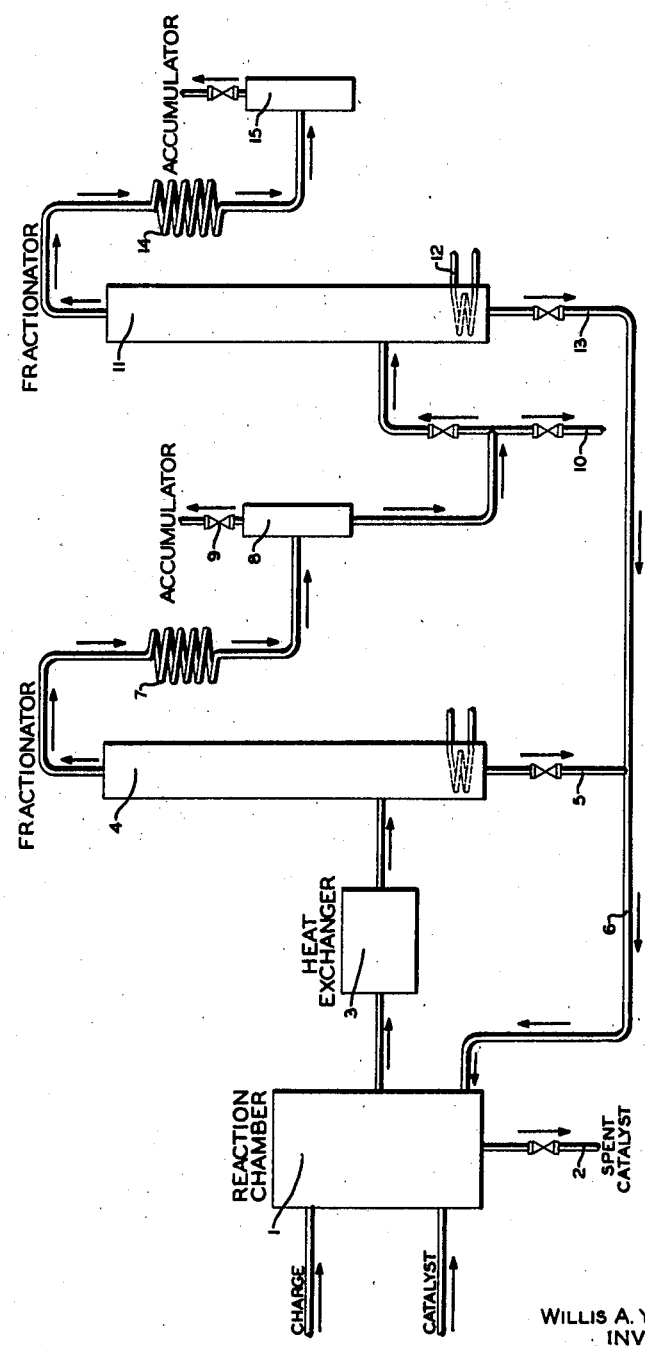

2,257,896

UNITED STATES PATENT OFFICE 2,257,896

CATALYTIC TREATMENT OF HYDROCARBONS

Willis A. Yarnall, Beacon, N. Y., assignor to The Texas Company, New York, N. Y., a corporation of Delaware Application March 24, 1939, Serial No. 263,871

5 Claims. (Cl. 260—676)

This invention relates to the catalytic treatment of hydrocarbons to effect molecular rearrangement thereof.

The invention broadly contemplates treatment of hydrocarbons with a catalyst comprising a metallic or metalloid halide dissolved in a liquefied hydrogen halide. It contemplates the catalytic treatment of hydrocarbons, particularly petroleum hydrocarbons, with a solution of a hydrogen halide, such as hydrogen chloride, hydrogen iodide, hydrogen bromide, and hydrogen fluoride, containing a halide of a polyvalent metal.

These polyvalent metals and metalloids comprise beryllium, boron, aluminum, silicon, phosphorus, sulphur, titanium, vanadium, chromium, iron, nickel, cobalt, copper, zinc, gallium, germanium, arsenic, selenium, zirconium, molybdenum, silver, cadmium, indium, tin, antimony, tellurium, cerium, tantalum, tungsten, mercury, lead, bismuth and uranium.

I am aware that it is known to treat petroleum and hydrocarbon constituents thereof with metallic halides as catalysts, and that it is known to employ these catalysts in the presence of a relatively small amount of a promoter such as hydrogen chloride, hydrogen fluoride, etc.

For example, as previously proposed, normal butane is converted to isobutane by treatment with anhydrous aluminum chloride (about 5 to 20% by weight of the butane) at temperatures of about 150 to 275° F. and in the presence of from about 0.01 to 10% of hydrogen chloride by weight of the normal butane.

The method of the present invention distinguishes from the foregoing by the employment of pressures higher than the vapor pressure of the hydrogen halide at the temperature of operation and by the use of sufficient quantities of the halogen halide so that the latter serves as a solvent in the liquid phase for the metallic halide. Under the conditions contemplated the polyvalent halides of the foregoing metals and metalloids are believed to form additive compounds with the hydrogen halide and which act as acids in the halogen halide solvent, somewhat similar to the action of sulphuric acid in water.

As previously stated, the reaction is carried out at pressures higher than the vapor pressure of the halogen halide at the temperature of treatment. For example, with hydrogen chloride, at temperatures of around 32° F. to 90° F., pressures in the neighborhood of around 2 to 3 atmospheres would be required to maintain the solvent in a liquefied condition. It will be appreciated, of course, that the temperatures, and therefore the pressures, in a given instance will depend upon the particular hydrocarbons undergoing treatment and upon the type of conversion desired.

The reaction in the case of isomerization of butane to isobutane is represented by the following equation:

In order to illustrate the invention further reference is made to the accompanying drawing which contains a flow diagram which may be followed in applying the catalytic solution of this invention to the treatment of normal butane to convert it to isobutane, for example.

Referring to the drawing, normal butane or a hydrocarbon mixture predominating in the normal butane is charged from a source not shown to a reaction chamber 1. The catalyst dissolved in the hydrogen halide may be charged to the reaction chamber 1 along with the hydrocarbon charge or it may be separately introduced, as indicated.

If desired, the hydrocarbon and catalytic solution may be caused to flow countercurrently to each other through the reaction chamber. On the other hand, the contact may be effected by simple batch operation. The reaction chamber may be provided with means for supplying heat, either externally or by means of an internal heating coil.

Where the catalyst comprises aluminum chloride dissolved in hydrogen chloride the proportion of aluminum chloride used may be around 5 to 20% by weight of the hydrocarbon treated, and, preferably, about 10%.

It is mixed with sufficient liquefied hydrogen chloride to permit complete solution. The temperature maintained within the reaction chamber may be around 30 to about 125° F., while the pressure therein is maintained sufficient to keep the hydrogen chloride in a liquefied condition.

The spent catalyst, with heavy hydrocarbon products, if any, may be withdrawn from the bottom of the reaction chamber through a pipe 2. The converted hydrocarbon is drawn off through a heat exchanger 3 wherein it is cooled or heated, as may be necessary, in order to condition it for subsequent fractionation.

The material is first introduced to a fractionator 4 wherein a major portion of the unreacted normal butane is condensed out and withdrawn through a pipe 5 and returned through a pipe 6 to the reaction chamber 1.

Vapors are conducted from the top of the fractionator 4 through a condenser 7 wherein the hydrocarbons, with the exception of the fixed gases, such as methane and ethane and hydrogen halides, are condensed and the condensate led to an accumulator 8. The fixed gases may be released through a relief valve 9. The released gases may be cooled and compressed to separate the hydrogen halides which may be recycled to the reaction chamber 1.

Where the liquid product collected in the accumulator 8 is essentially isobutane it may be unnecessary to give it further treatment other than neutralization by an alkaline wash. In this instance the product may be withdrawn and discharged from the system through a valved pipe 10. Where the product contains substantial amounts of hydrocarbon, other than isobutane, for example, propane and some normal butane, it may be passed directly to a fractionator 11 equipped with a heating means, such as a steam coil 12.

In the fractionator 11 the hydrocarbons are fractionated to separate the normal butane from the products of lower boiling point. The normal butane is collected as a liquid in the lower portion of the fractionator and is withdrawn therefrom through a pipe 13 communicating with the pipe 6 leading to the reaction chamber 1.

The isobutane is removed overhead from the fractionator 11 through a condenser 14 to an accumulator 15.

If there are substantial amounts of other hydrocarbons, such as propane, present, it may be desirable to make a separation between the propane and isobutane whereby the propane would be removed overhead from the top of the fractionator 11 and the isobutane withdrawn as a side stream.

Obviously, many modifications and variations of the invention, as hereinbefore set forth, may be made without departing from the spirit and scope thereof, and therefore only such limitations should be imposed as are indicated in the appended claims.

I claim:

1. The method of catalytically treating petroleum hydrocarbons to effect molecular rearrangement of said hydrocarbons, which comprises dissolving a halide selected from the non-gaseous halides of polyvalent metals and metalloids in a sufficient amount of an anhydrous liquefied hydrogen halide to substantially completely dissolve the metallic halide and to form an anhydrous liquid catalyst, subjecting said hydrocarbons to intimate contact with said liquid catalyst said catalyst being maintained in the liquid phase, and maintaining the hydrocarbons in contact with the liquid catalyst whereby conversion is effected.

2. The method of catalytically treating gaseous petroleum hydrocarbons to effect molecular rearrangement of said hydrocarbons, which comprises forming an anhydrous solution of a non-gaseous polyvalent metallic halide in a sufficient amount of liquefied hydrogen halide to substantially completely dissolve the metallic halide and to produce a liquid catalyst, subjecting the gaseous hydrocarbons to intimate contact with said liquid catalyst, said catalyst being maintained in the liquid phase, and maintaining said hydrocarbons in contact with the liquid catalyst whereby conversion is effected.

3. A process for the conversion of normal paraffin hydrocarbons to isoparaffins, which comprises forming a non-aqueous solution of a non-gaseous polyvalent metallic halide in a sufficient amount of a liquefied hydrogen halide to substantially completely dissolve the metallic halide, subjecting the normal paraffin hydrocarbons to intimate contact with the catalyst maintained in the liquid phase, and maintaining the hydrocarbons in contact with the liquid catalyst for sufficient time to effect substantial conversion.

4. A process for the conversion or normal butane to isobutane, which comprises forming a non-aqueous solution of aluminum chloride dissolved in a sufficient amount of a liquefied halogen halide to substantially completely dissolve the metallic halide, subjecting the normal butane to intimate contact with the catalyst maintained in the liquid phase, and maintaining the normal butane in contact with the liquid catalyst at a temperature of around 30 to 125° F. for sufficient time to effect substantial conversion to isobutane.

5. The method according to claim 4 in which the halogen halide comprises hydrogen chloride.

WILLIS A. YARNALL.